United States Patent [19]

Baugh

[11] Patent Number: 4,878,783
[45] Date of Patent: Nov. 7, 1989

[54] HYDRAULIC STAB CONNECTOR WITH ANGULAR FREEDOM

[76] Inventor: Benton F. Baugh, 14626 Oak Bend, Houston, Tex. 77079

[21] Appl. No.: 138,433

[22] Filed: Dec. 28, 1987

[51] Int. Cl.⁴ ............................................. F16L 1/04
[52] U.S. Cl. .................................. 405/169; 166/344; 405/191
[58] Field of Search ............ 405/191, 190, 188, 169, 405/170, 171; 285/27, 24; 166/341, 343, 338, 344

[56] References Cited

U.S. PATENT DOCUMENTS

| | | | |
|---|---|---|---|
| 4,591,292 | 5/1986 | Stevens et al. | 405/169 |
| 4,682,913 | 7/1987 | Shatto et al. | 405/191 X |
| 4,740,110 | 4/1988 | Saffrhan | 405/227 X |

Primary Examiner—Dennis L. Taylor

[57] ABSTRACT

A hydraulic stab sub especially for use in remote and harsh environments which is capable of being inserted into a close fitting receptacle at a relatively high angular mismatch by providing for radial relative movement of sealing rings and seal holding rings with reference to the centerline of the hydraulic stab sub.

11 Claims, 2 Drawing Sheets

HYDRAULIC STAB CONNECTOR WITH ANGULAR FREEDOM

FIELD OF THE INVENTION

The present invention relates to an apparatus for use in connecting a fluid conduit carried by an ROV (Romotely Operated Vehicle) to a fluid conduit or receptacle of a subsea equipment assembly, such as hydraulically operated device, in a nonbinding manner.

BACKGROUND OF THE INVENTION

As offshore drilling operations progress into deeper waters, especially in depths of water greater than 1000 feet, many relatively simple suface operation become complex and costly. One frequent operational requirements is that of engaging a hydraulic stab sub receptacle with a probe for the propose of applying hydraulic flow and pressure to operate a function. The function can be a valve, blowout preventer, test port, or other such items.

Systems which provide guidelines or wire ropes from the surface vessel to the ocean flooor equipment provide a predetermined path to the equipment which can be easily followed by service systems and can be keyed off of to locate the appropriate receptacle.

In operations conducted with dynamically positioned vessels, there are no typically guidelines to direct equipment and service systems to the ocean floor. Dynamically positioned vessels are those which are held in place by the power of their propellers rather than by anchors. In this case, finding the general location of the equipment and keying into a specific area for service operations such as hydraualic stabs is typically done by an ROV. An ROV is a remotely operated vehicle which is small unmanned submarine equipped with sonar and television systems.

The hydraulic stab receptacles are characteristically designed to contain relatively high pressures such as 3000, 5000 or 10,000 p.s.i. The close fit fit between the bore of the hydraulic stab receptacles and the outer diameter of the hydraulic stabs required to prevent the extrusion of the seals provides the conventional disadvantage of requiring a close angular alignment to allow this installation. It is generally estimated that a stab needs to make an engagement to a depth equal to the diameter of the stab to prevent binding. For a typical 1.375" outer diameter stab and a 0.010" diametrical tolerance, this mens that the stab must be aligned with the receptacle within less than ½ degree.

This degree of alignment is difficult to control on devices which are guided down guidelines to fixed positions before attempting to make the stab. When a free swimming vehicle such as an ROV attempts to make the engagement the problems are even more difficult. The stab and receptacle are viewed with one or more televisions cameras on the ROV. An operator at the surface must watch the television screens and make the engagement with remote manipulator arms or vehicle movement. The ROV is typically moving and the cameras' fisheye lenses distort the view of the parts.

The task can be accomplished in this fashion. It may take a long time, but the stab can eventually be worked into the receptacle. On a recent installation in the Gulf of Mexico, an ROV service company attached a piece of relatively stiff wire rope to a hydraulic stab receptacle and the flexibility assisted in the stabbing process. Making the devices oversized enough to allow for a stepped engagement will assist in eliminating the binding at the expense of size on each of the receptacles. U.S. Pat. No. 4,682,913 gives an illustration of this style design.

In shallower waters where divers are required engage hydraulic stab subs into receptacles, the close alignment is still a problem, but to a lesser degree. The diver is capable of wiggling the stab into alignment by hand much more readily than can be done by remote operations.

SUMMARY OF THE INVENTION

The object of the present invention is to provide a hydraulic stab sub which is capable of being inserted into a receptacle at angles greater than those associated with conventional high pressure components by providing for radial relative movement of sealing rings and seal holding rings with reference to the centerline of the hydraulic stab sub.

By having the various outer diameters and seal rings on the hydraulic stab receptacle capable of moving radially about the centerline of the hydraulic stab sub, simple angular misalignment can be achieved before, during, and after the engagement process.

DESCRIPTION OF THE PREFERRED EMBODIMENT

Figure 1:
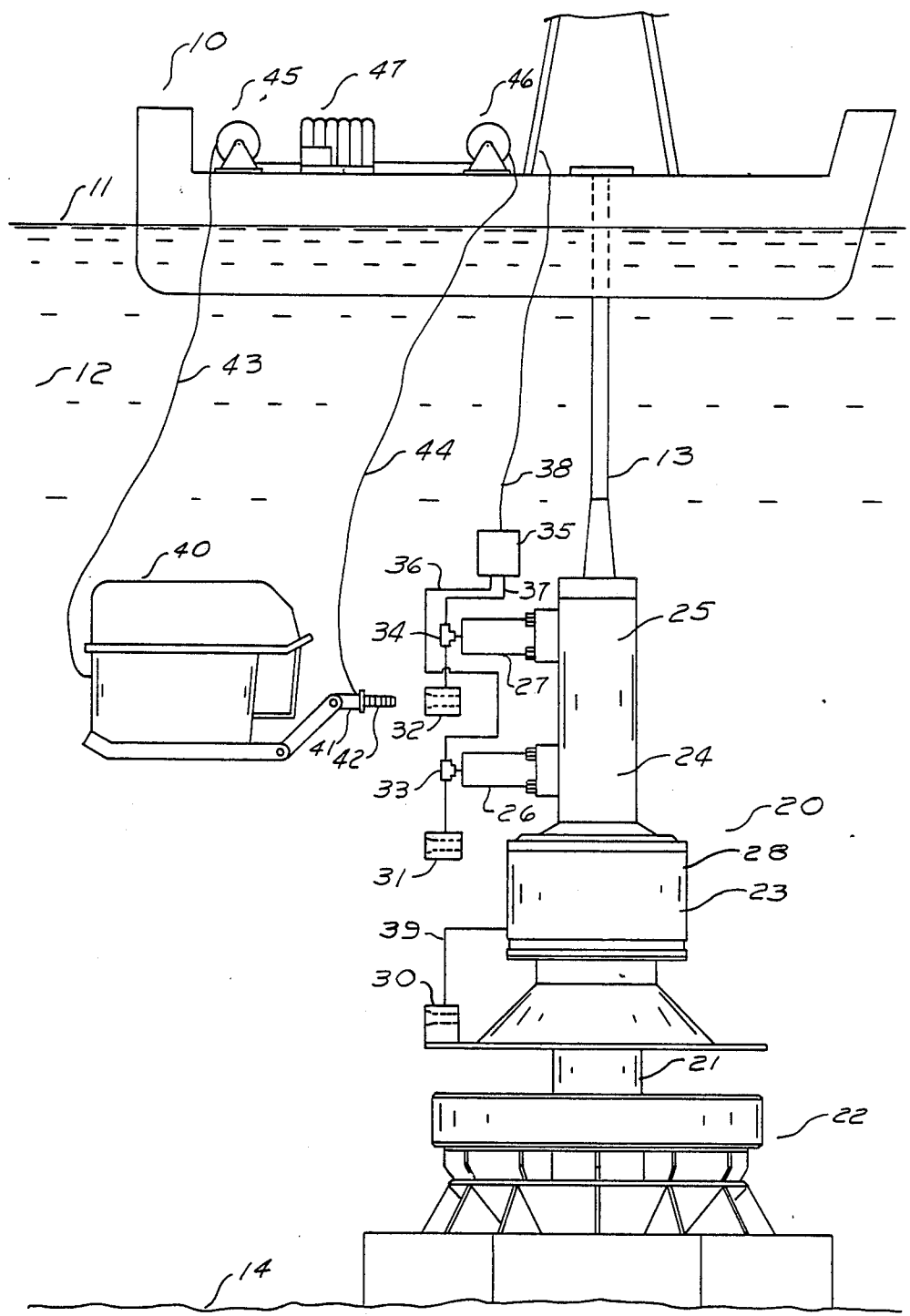
FIG. 1 is a schematic representation of an underwater vehicle positioned adjacent to a subsea equipment assembly.

Referring now to FIG. 1, a vessel 10 is shown floating upon the surface 11 of the body of water 12. A riser assembly 13 extends downwardly from the vessel 10 towards the bottom 14 of the body of water 12. The lower elements of the riser assembly 13 consist, in this example, of a subsea wellhead assembly 20 typically positioned on or near the bottom 14 of the body of water 12. Extending downwardly into the earth formation for drilling and completion operations is housing assembly 21 which suspends one or more strings of casing and is landed on landing base 22.

It is recognized that the term subsea wellhead assembly is meant to include any assemblage of components either fixedly or removably secured to the top of the housing assembly 21, either during the drilling, completion, production, reworking, or maintenance of a well. Thus, during the drilling of a well, the subsea wellhead assembly may comprise certain components such as blowout preventers, valves, connectors, etc.

The subsea wellhead assembly 20 comprises various components such as a hydraulically operated connector 23 and hydraulically actuated valves 24 and 25 which are actuated by valve actuators 26 and 27 respectively. The operator 28 for the connector 23 is made typically made integally with connector.

Receptacles 30, 31, and 32 aare provided for receiving hydraulic flow and pressure to operate connector 21 and valves 24 and 25 respectively. Receptacles 31 and 32 are connected to valves 24 and 25 thru shuttle valves 33 and 34. Shuttle valves 33 and 34 are further connected to a control means 35 thru hoses 36 and 37. Control means 35 is connected by control hoses 38 to the surface. Normal control of these functions is thru the control means 35 from the surface. When required, secondary or emergency control can be achieved by pressuring thru the receptacles. The shuttle valves 33 and 34 prevent the signal from one port to communicate with the opposite port, as is well known in the industry.

Receptacle 30 is connected to the hydraulically operated connector 21 by hose 39 and is not operated redundantly from the surface. The only means of operating this connector is thru the receptacle.

ROV 40 is shown with a manipulator arm 41, a hydraulic stab sub 42, hose 43 which receives hydraulic and/or electric power from the surface to operate the ROV, and hose 44 which receives hydraulic power from the surface for the hydraulic stab sub 42.

On the vessel 10 at the surface the hose 43 connects to reel 45 and the hose 44 connects to the reel 46. Both reel 45 and reel 46 are shown connected to the hydraulic accumulator skid 47.

The ROV 40 is capable of vertical or horizontal movement and is capable of positioning itself near any of the receptacles 30, 31, or 32 at the conmmands of the operator at the surface.

Figure 2:
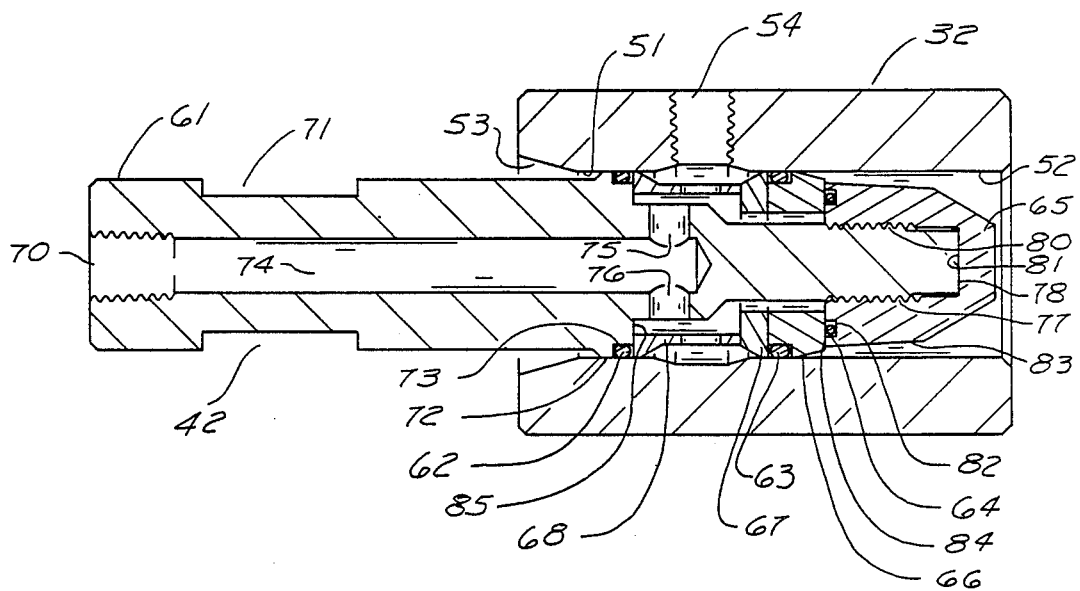
FIG. 2 is a half section of a hydraulic stab sub and receptacle of this invention which has the centerline of the hydraulic stab sub and the centerline of the receptacle in alignment.

Referring now to FIG. 2, receptacle 50 is shown to have smooth bores 51 and 52 which are of close tolerance manufacture, typically with a tolerance range of from 0.003" to 0.005". Chamfer 53 provides for the smooth entrance of the seals into the bore 51 and provides some lateral guidance for entrance into the hole. Threaded port 54 provides for the connection of and outlet hose, such as hose 39 of FIG. 1. An enlarged portion of the bore 55 provides a clearance for seals to pass along the bore without being damaged on the inner end of the threaded port 54.

The hydraulic stab sub 60 comprises body 61, seals 62, 63 and 64, nose 65, seal carrier 66, sliding ring 67, and sliding spacer 68.

The body 61 provides threaded port 70 for connection of a hose such as hose 44 in FIG. 1. Body 61 further provides gripping profile 71, close tolerance diameter 72, O-Ring seal diameter 73, dlow passages 74, 75, and 76, male thread 77, and stop surface 78. Close tolerance diameter 72 provides a relatively close fit with respect to diameter 51, yet with a sufficiently short axial length as to not prevent angular misalignment of the receptacle 50 with the hydraulic stab sub 60. On a standard 1.375" diameter receptacle, with a minimum diametrical clearance of 0.010", an maximum axial length of 0.165" will provide this capability.

Nose 65 provides female thread 80, a stop surface 81 for engaging stop surface 78 when female thread 80 is engaged onto male thread 77, a seal groove 82 for receiving seal 64, and an outer tapered diameter 83. I FIG. 3, if a line is drawn from the close tolerance diameter 72 at 3 degrees from the centerline of the hydraulic stab sub 60, it will coincide with the outer tapered diameter 83 of the nose 65.

When the nose 65 is installed on the body 61, a distance is provided between the face 84 on the nose 64 and the face 85 on the body 61. The combined axial length of the seal carrier 66, the sliding ring 67, and the sliding spacer 68 is slightly less that the length provided between the faces 84 and 85.

When assembled, it allows the seal carrier 66, the sliding ring 67, and the sliding spacer 68 to move radially about the centerline of the body 61. The seal carrier 66, the sliding ring 67, and the sliding spacer 68 each have a close tolerance diameter similar to 72 and can tolerate angular misalignment.

In this way, when the hydraulic stab sub 60 is moved to a position of angular mismatch with respect to the receptacle 50, the seal carrier 66, the sliding ring 67, and the sliding spacer 68 can slide against each other like a stack of washers to accommodate the angular mismatch.

The angular mismatch of the body 61 and the seal carrier 66 provide a radial mismatch in the position the inner sealing diameters for the seal rings 62 and 63. On a 1.375" outer diameter hydraulic stab sub at 3 degrees angular mismatch, the center of the seal groove is offset approximately 0.0038", which is considerably less than the nominal seal squeeze of 0.013", and is not detrimental to the sealing charcteristics.

Figure 3:
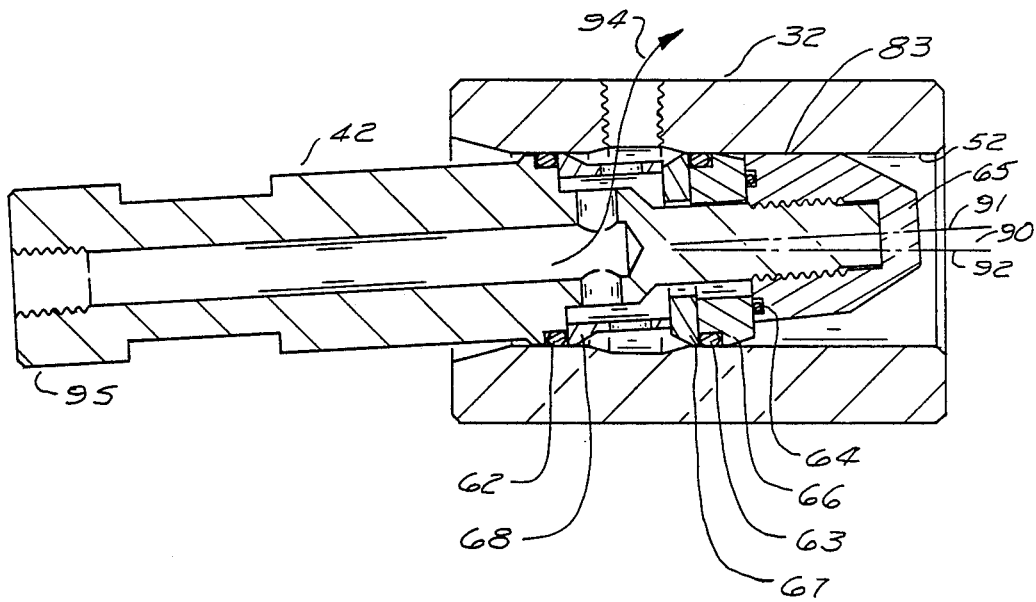
FIG. 3 is a half section of a hydraulic stab sub and receptacle of this invention which has the centerline of the hydraulic stab sub and the centerline of the receptacle at an angle with respect to each other.

Referring now to FIG. 3, hydraulic stab sub 60 is at a mismatch angle 90 with respect to receptacle 50. In this case, this is the maximum mismatch angle possible as the outer taper diameter 83 of nose 65 is contacting athe bore 52 of receptacle 50. The seal carrier 66, the sliding ring 67, and the sliding spacer 68 are each offset from the centerline of 91 of hydraulic stab sub 60, and are in fact generally aligned with centerline 92 of the receptacle 50. Each of the seals 62, 63, and 64 are in sealing position and fluid flow can be pass thru the assembly generally as is indicated by the arrow 94.

Further, as the hydraulic stab sub 60 is presently positioned with it connecting end 95 in a down position, it can be equally well moved to an up, left, right, or centered position. This complete universal movement capability within the maximum angle 90 can be done with or without pressure and or flow passing along the line as indicated by the arrow 94.

Further, the hydraulic stab sub 60 can be removed and installed while being held at any angle and at any direction up to the maximum angle 90.

An obvious reversal of parts on this invention is to fix the seal 63 with respect to the centerline of the body 61 and allow the seal 62 to have the radial movement presently illustrated in the figures. An additional application of this invention would be to allow both seal, 62 and 63 to have radial movement freedom to increase the amount of angular mismatch which can be tolerated.

The foregoing disclosure and description of this invention are illustrative and explanatory thereof, and various changes in the size, shape, and materials, as well as the details of the illustrated construction may be made without departing from the spirit of the invention.

I claim:

1. An apparatus for use in combination with subsea oil well drilling, completion, workover, and service systems and the such like which is located below the surface of a body of water having fluid conduit devices or receptacles, comprising:

a hydraulic stab sub with two or more seals for inserting into, sealing within, and commuicating fluid or gas to a receptacle comprising:

a body with a first face and a first seal means and a centerline, a nose member with a second face and means for attaching to said body, said first face and said second face being an axial distance apart when said nose is attached to said body, a seal carrier with a second seal means capable of radial movement with respect to said centerline of said body, said seal carrier having an axial length less that said axial distance, a third seal means sealing between said seal carrier and said nose during said radial movement such that when said seal carrier moves radially with respect to said body, sealing contact is maintained between said seal carrier and said nose, such that said hydraulic stab sub can be inserted into said receptacle without precise alignment due to the ability of said second seal on said seal carrier to move radially with respect to said first seal on said body, said hydraulic stab sub further comprising attachment means for the purpose of gripping by grippers on remotely operated vehicles or diver's hands, said receptacle further providing guidance chamfers to facilitate the insertion of said hydraulic stab receptacle into said receptacle, and said hydraulic stab receptacle provides guidance chamfers to facilitate insertion into said receptacle.

2. An apparatus for use in combination with subsea oil well drilling, completion, workover, and service systems and the such like which is located below the surface of a body of water having fluid conduit devices or receptacles, comprising:

a hydraulic stab sub with two or more seals for inserting into, sealing within, and communicating fluid or gas to a receptacle comprising:

abody with a first seal means and a centerline, a seal carrier with a second seal means capable of radial movement with respect to said centerline of said body, such that said hydraulic stab sub can be inserted into said receptacle without precise alignment due to the ability of said second seal on said seal carrier to move radially with respect to said first seal on said body.

3. The invention of claim 2, further comprising a first face on said body and a nose member with a second face and means for attaching to said body.

4. The invention of claim 3, further comprising that said first face and said second face being an axial distance apart when said nose is attached to said body.

5. The invention of claim 4, wherein said seal has a axial length less than said axial distance.

6. The invention of claim 5, incluing a third seal means sealing beteween said seal carrier and said nose during said radial movement such that when said seal carrier moves radially with respect to said body, sealing contact is maintained between said seal carrier and said nose.

7. The invention of claim 2, wherein said hydraulic stab sub further comprising attachment means for the purpose of gripping by grippers on remotely operated vehicles or diver's hands.

8. The invention of claim 2, wherein said receptacle further providing guidance chamfers to facilitate the insertion of said hydraulic stab receptacle into said recepatacle.

9. The invention of claim 2, wherein said hydraulic stab receptacle provides guidance chamfers to facilitate insertion into said receptacle.

10. In a hydraulic stab sub with two or more seals for inserting into, sealing within, and communicating fluid to a receptacle comprising:

a body with a first face and a first seal means and a centerline, a nose member with a second face and means for attaching to said body, said first face and said second face being an axial distance apart when said nose is attached to said body, a seal carrier with a second seal means capable of radial movement with respect to said centerline of said body, said seal carrier having an axial length less that said axial distance, a third seal means sealing between said seal carrier and said nose during said radial movement such that when said seal carrier moves radially with respect to said body, sealing contact is maintained between said seal carrier and said nose, such that said hydraulic stab sub can be inserted into said receptacle without precise alignment due to the ability of said second seal on said seal carrier to move radially with respect to said first seal on said body.

11. In a hydraulic stab sub with two or more seals for inserting into, sealing within, and communicating fluid to a receptacle comprising:

a body with first seal means and a centerline, a seal carrier with a second seal means capable of radial movement with respect to said centerline of said body, such that said hydraulic stab sub can be inserted into said receptacle without precise alignment due to the ability of said seal carrier to move radially with respect to said first seal on said body.

* * * * *